Patented Apr. 7, 1936

2,036,360

UNITED STATES PATENT OFFICE 2,036,360

PROCESS OF COOKING EDIBLES

Reuben Romney, Jr., Salt Lake City, Utah, assignor to Cheezits Corporation, Salt Lake County, Utah, a corporation of Utah No Drawing. Application April 1, 1935, Serial No. 14,127

3 Claims. (Cl. 99—100)

My invention relates to confections and has for its object to provide a new and highly palatable confection made with the following process which produces a cheese coated potato chip.

A further object is to provide a cheese covered potato chip which will have the cheese so cooked that it will adhere to the chip in a manner such as will permeate the chip with cheese flavor and coat the outside of the chip either wholly or in part with cheese and which will aid the keeping qualities of the potato chip preventing them from getting rancid so quickly.

A further object is to provide a process of making cheese coated potato chips and at the same time provide a longer lasting chip and one in which the cheese flavor has entirely permeated the potato.

These objects I accomplish with the following process of manufacturing:

In manufacturing my chips for market I first prepare the chips for cooking in a manner identical or similar to that used by any potato chip factory, mainly, wash, slice, and soak in water to clean the potato, and free the starch therefrom. When the chips are dried to the proper amount for cooking, I prepare the cheese. The cheese must be prepared before the potatoes are cooked and I do that in the following manner: I take a good grade of cheese and grate it to a medium fine consistency and leave the cheese exposed to the air in drying racks to air dry it to the proper consistency This can only be determined by using a small amount of fat and when the cheese has dried to test it in the hot fat to see whether it entirely melts into the fat or whether it is at the correct dryness to adhere to the potatoes when they are cooking. When the cheese is ready for cooking, the potatoes are set in the hot fat and cooked about two minutes or until they have commenced to get crisp or slightly brown. I then throw or sprinkle a desired quantity of the grated semi-dried cheese over the surface of the oil in which the potatoes are cooking, at the same time stirring the potatoes in the oil. The cheese will instantly settle into the fat and sputter while it is melting and as the potatoes are being stirred, the cheese will commence to adhere to the potatoes. As the cooking and stirring continues, the cheese continues to adhere to the chips until the chips are entirely browned or cooked as desired, at which time they are removed from the fat and seasoned and set in suitable drains to drain off the excess fat therefrom.

The chips may then be packed in suitable sacks or containers and are ready for market.

Having thus described my invention, I desire to secure by Letters Patent and claim:

1. A process of preparing cheese coated potato chips, comprising cooking the potato chips in deep fat until partially done; introducing partially dried cheese into the fat and stirring the cheese, fat and potato chips until the potato chips are done; removing the potatoes from the fat and draining off the excess fat and finally salting the chips to taste.

2. A process of manufacturing cheese potato chips, comprising air drying cheese; preparing potatoes for cooking by cleaning, slicing, and soaking them, placing them in deep fat, adding the air dried cheese to the deep fat when the potatoes are near done, and stirring the potatoes in the fat during cooking to bring the potatoes into contact with the cooking fat and cheese, to adhere the cheese to the potatoes.

3. A process of preparing cheese coated sliced potatoes comprising, preparing the sliced potatoes in the regular manner, cooking the sliced potatoes in deep fat and adding semi-dried grated cheese to the fat to come into contact with the potato slices while in the last stages of cooking, to adhere the cheese to the outer surfaces of the potato slices.

REUBEN ROMNEY, Jr.